Patented Feb. 4, 1930

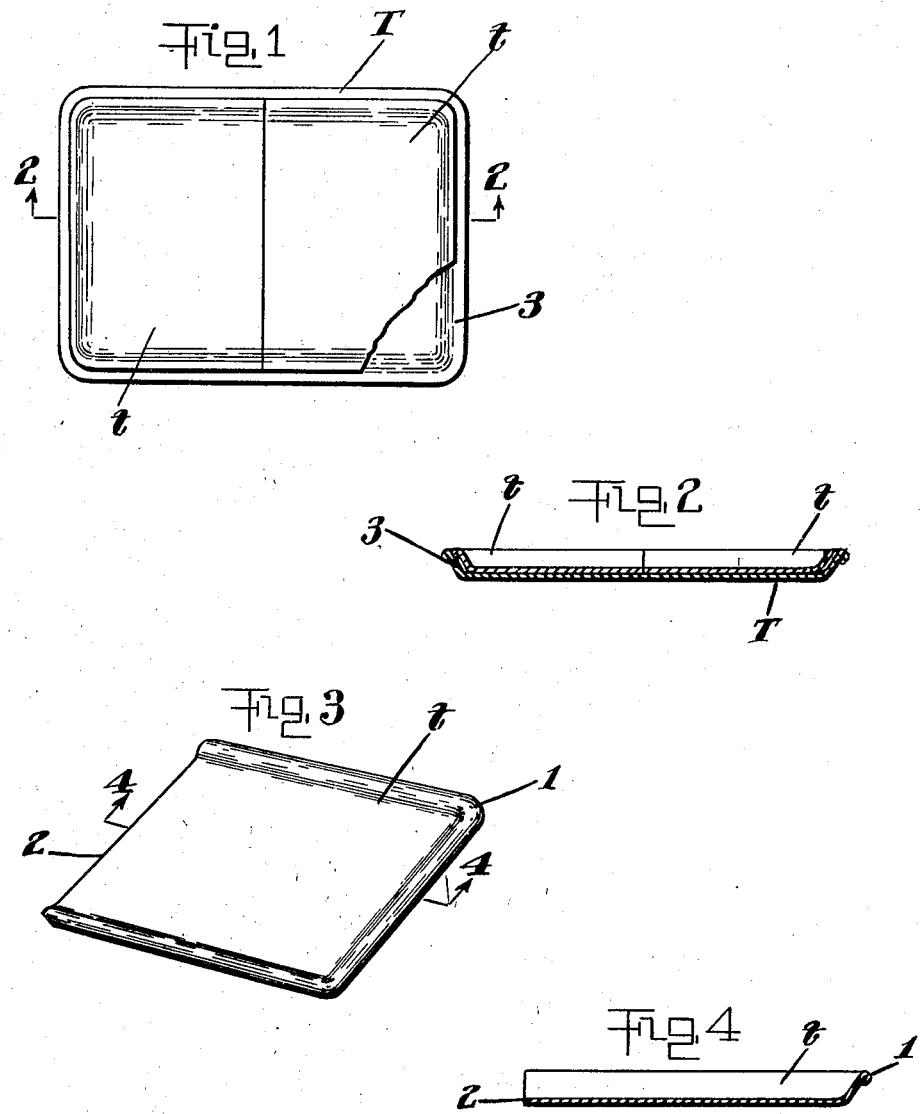

1,745,606

UNITED STATES PATENT OFFICE

EDWARD DANA DENSMORE, OF BROOKLINE, AND GIFFORD LE CLEAR, OF WABAN, MASSACHUSETTS; GIFFORD LE CLEAR AND NORMAN W. BINGHAM, BOTH OF NEWTON, MASSACHUSETTS, EXECUTORS OF SAID EDWARD DANA DENSMORE, DECEASED, ASSIGNORS TO SAID GIFFORD LE CLEAR

FOOD SERVICE FOR HOSPITALS AND THE LIKE

Application filed June 29, 1926. Serial No. 119,330.

Our present invention contemplates the service of foods of different temperatures, each food being presented to the consumer in a condition which its method of preparation or cooking requires to give it the individual characteristic appeal planned for it. Hot foods should be served hot in order to preserve their appeal and similarly cold foods and particularly iced foods must be served at a temperature well below room temperature in order to preserve their piquancy or appeal. It is particularly important in hospitals and similar institutions to maintain the foods in the condition in which they leave the kitchen. Our invention contemplates a traying system and consists of separate tray units which may be individually filled with either hot or cold foods and the independently trayed units maintained at a suitable temperature up to the time of delivery to the patient or other consumer when they can be consolidated and served jointly. For example, in presenting food to a patient in a hospital a hot tray unit and a cold tray unit may be consolidated in a mother tray or frame of suitable dimensions adapted to a bed table or other support for the patient's meal.

In the drawings we have illustrated a form of our invention which has proven highly satisfactory and practical in use. Throughout the specification and drawings like reference characters are employed to indicate corresponding parts. In the drawings:

Figure 1 is a plan view of a tray assembly partly broken away.

Fig. 2 is a longitudinal section of the same.

Fig. 3 is a plan view of a tray unit, and

Fig. 4 is a longitudinal section of the same.

Our tray units $t$ may be of any construction completely flanged or otherwise. In the form shown, the unit $t$ is flanged or rimmed about three sides as at 1 leaving one free edge 2. This is of advantage in assembly as it permits a ready readjustment of the dishes on the tray sections so that the dishes can overlap the joint if necessary. It is further of advantage in clearing and crumbing the trays as well as in washing and draining them. These small units $t$ are adapted to be received in a mother frame or tray T in which they fit as indicated in Figs. 1 and 2. The mother tray T is also provided with a flanged edge 3. The units $t$ are proportioned to the size of the mother tray.

My tray units are of particular value in connection with the subject matter of my copending application Serial No. 347,654, filed March 16, 1929, the proportioning not only of the tray units but also of the mother tray being such as to be particularly adapted for use in the apparatus disclosed therein.

In use, for example, in a hospital, my tray would be utilized as follows:

The food is maintained in the kitchen in suitable hot or cold condition. The particular foods desired are arranged by the nurse in charge on my tray units $t$ which are conveyed separately in suitably temperatured conveyors to the patient's room or ward. The tray units $t$ are then removed from the conveyor and are arranged as shown in Figs. 1 and 2 within the mother tray T. By such means the patient is presented with both hot and cold foods each in its proper condition and at the right temperature.

When the patient has finished with the tray the same may be returned to the kitchen where the dishes are removed and the tray units $t$ removed from the mother tray T. When the trays are cleared of dishes they may be knocked down, washed and nested ready for further use.

Our invention is not to be construed as limited to exact structure or disposition of units but may and probably will be variously modified without departing from the spirit of our invention if within the limits of the appended claims.

What is therefore claimed and desired to be secured by Letters Patent is:

1. In an equipment for traying and handling hot and cold dished foods, a plurality of tray segments each having an open edge disposable adjacent the open edge of a like segment in assembly and adapted to receive in traying service miscellaneous dishes of food of like thermal character, and a frame removably receiving said tray segments in assembly as a combined unit for individual service.

2. In an equipment for traying and handling hot and cold dished foods, a plurality of tray segments each comprising a supporting rim portion and a bottom portion having an open edge disposable adjacent the open edge of a like segment in assembly, and adapted to receive in traying service miscellaneous dishes of food of like thermal character, and a frame removably receiving said tray segments in assembly as a combined unit for individual service.

3. A combined serving unit including a bottom rimmed member and an upper tray section interfitting the said bottom member, the said upper section being divided radially providing serving sections, whereby independently-trayed hot and cold foods contained in said sections may be served by assembling said sections in complemental relation on said bottom section for service.

4. A combined serving unit including a bottom rimmed member and an upper tray section similar in shape to and interfitting said bottom member, said upper section being divided medially providing serving sections whereby independently trayed hot and cold foods in said sections when the latter are separated may be simultaneously served by their assembly in complementary relation on the bottom section.

In testimony whereof we affix our signatures.

EDWARD DANA DENSMORE.
GIFFORD LE CLEAR.